Nov. 11, 1941.  K. PAPE  2,262,514
MANUFACTURE OF COVERED TUBING
Filed April 27, 1940  2 Sheets-Sheet 1

INVENTOR.
Karl Pape
BY Williams, Rich & Morse
ATTORNEYS

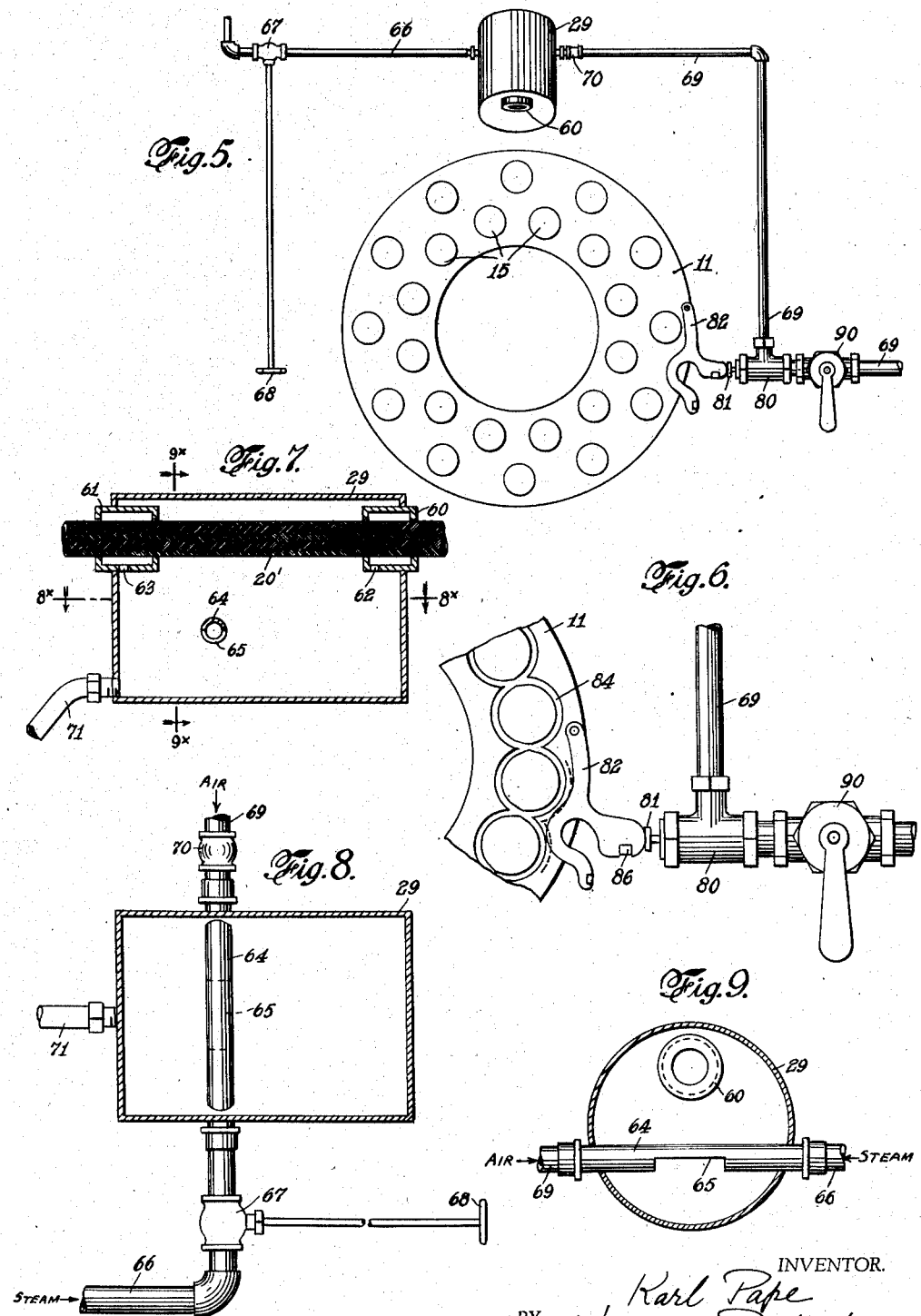

Patented Nov. 11, 1941

2,262,514

UNITED STATES PATENT OFFICE 2,262,514

MANUFACTURE OF COVERED TUBING

Karl Pape, Dover, N. J., assignor to Resistoflex Corporation, Belleville, N. J., a corporation of New York Application April 27, 1940, Serial No. 331,952

7 Claims. (Cl. 154—8)

This invention relates to the manufacture of flexible tubing which has a covering of textile fabric formed directly thereon.

More particularly, the invention pertains to the manufacture of fabric covered tubing which has as its core or inner layer an extruded tube of flexible synthetic plastic material, such, for example, as the tubing of plasticized polyvinyl alcohol which is described in U. S. Patent No. 2,053,112 issued to Ernst Schnabel. It is applicable generally, however, to other materials having similar physical characteristics.

In the manufacture of extruded tubing from plastic materials, certain minor irregularities and variations in its diameter are unavoidable by reason of the nature of the extrusion process. The material is forced through a die under pressure in a very plastic state, frequently with the application of internal air pressure to keep the walls of the tubing from collapsing while soft, and slight variations in such pressure, in the rate of extrusion, or in other factors may cause slight increases and decreases in the size of the tubing.

In accordance with present methods of covering such tubing in the ordinary braiding machine or in a loom for weaving tubular fabric, the irregularities in the form or the diameter of the tubing remain in the finished product because the fabric covering follows the contour of the tubing as it is formed thereon. Such irregularities give rise to a number of difficulties in subsequent manufacturing processes to which the covered tubing is subjected, among which the following may be mentioned: Subsequent coatings or coverings such as lacquer, rubber or the like are applied over the fabric cover, in the application of which the tubing is drawn through a die of fixed size. If the diameter of the covered tubing is not uniform within small tolerances, such subsequent coating is not uniform in thickness. It may be extremely thin at those spots where the tubing is oversize and be so thick as to smear or be otherwise marred where the tubing is undersize. In use, the tubing is usually provided with fittings or couplings which are manufactured in standard sizes. If the tubing size varies, it becomes impossible to assure a proper fit with these members or a uniform strength of the assembled unit at the points of attachment.

It is an object of this invention to eliminate these difficulties and to produce a covered tubing of greatly improved uniformity, in which any irregularities existing in the dimensions or surface of the uncovered stock have been removed.

Other objects are the production of a uniform bonding of the fabric cover to the tubing and the provision of means for uniformly subjecting the covered tubing to solvent vapors for this purpose, said means being rendered inoperative automatically upon stopping of the machine by which the covering is formed and applied.

A further object is the formation of a braided or otherwise woven covering of great regularity and smoothness directly on tubing which is flexible and elastic.

To these ends the invention comprises novel processes and apparatus as hereinafter described.

In accordance with this invention the covering is woven on the tubing within the orifice of a die, which is fixed at the appropriate point in any suitable fabric forming machine, the said orifice being of such relative size and shape as to give to the tubing which is drawn through it a uniform size at the time the cover is formed thereon. The covering is applied to the tubing under a uniform tension which is sufficient substantially to maintain the uniformity of size imparted to the tubing by the die. To assure the proper action of the die upon the tubing and to prevent the formation of folds or creases in the tubing as it is drawn through the die, and for other reasons hereinafter explained, the tubing is preferably maintained under an inflating pressure during the carrying out of the covering process. This may readily be done by closing one end of the tubing and connecting the other end to a source of compressed air. The invention may be practiced, however, without such inflation.

It is to be understood that the term "weaving" as used hereinafter or in the claims is intended to include braiding as a particular type of weaving, and that reference to "fabric" or "textile fabric" includes not only coverings formed of the various types of fibrous yarns but also coverings formed of wires or other filaments.

As an illustration of how the invention may be practiced, the carrying out of the process and the apparatus used therefor will now be described. This embodiment of the invention involves the covering of tubing of extruded plasticized polyvinyl alcohol, the essential characteristics of which may well be kept in mind for a better understanding of the description. This material is flexible, very tough and somewhat elastic. Tubing made thereof is thus capable of being slightly expanded when filled with compressed air. Polyvinyl alcohol is more or less soluble in water and capable of being softened slightly and rendered adhesive on its surface when subjected to steam for only a short time. It is insoluble in almost all other solvents.

The covering of the tubing may be accomplished in a braiding machine of well-known construction, modified by the addition of the die referred to above, a pair of auxiliary gripping wheels preferably being used for drawing the tubing through the die at a uniform rate, and a steaming chamber through which the tubing passes as it leaves the machine. The apparatus employed is illustrated in the drawings in which:

Fig. 5 illustrates the means for controlling the steaming of the tubing in association with a part of the braiding machine;

Fig. 6 shows in detail the automatic air control and the means for actuating it upon stopping of the braiding machine;

Fig. 7 is a vertical longitudinal section through the steaming device, Fig. 8 is a section of the same on the line $8^x$—$8^x$ of Fig. 7, and Fig. 9 is a cross-section on the line $9^x$—$9^x$ of Fig. 7.

Figure 1:
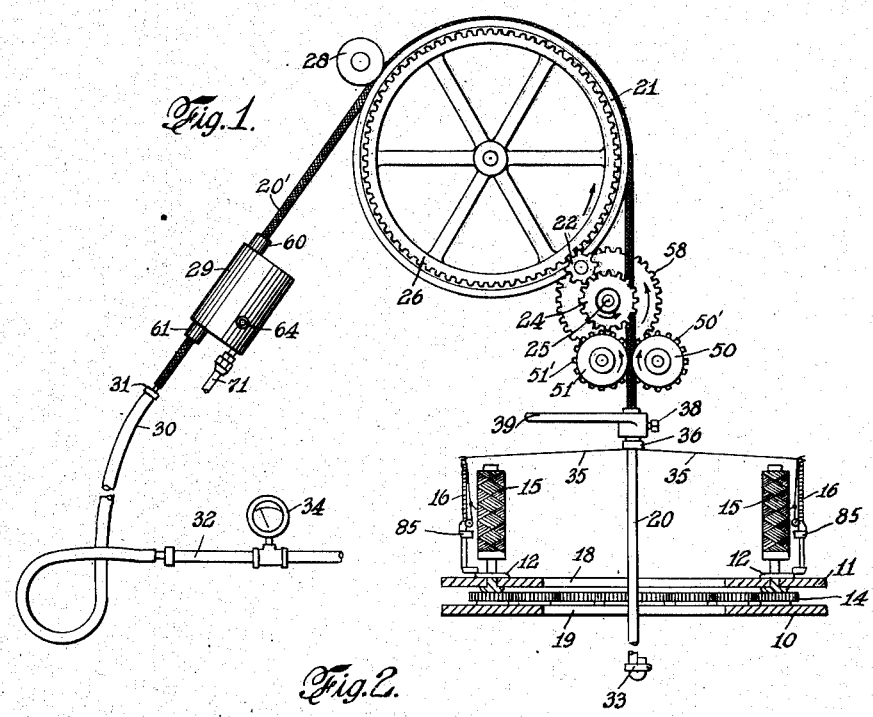
Fig. 1 shows certain essential parts of a common type of braiding machine with the additions referred to above, the steaming device and means for supplying compressed air to the tubing.

Fig. 1 shows certain essential parts of a common type of braiding machine including a fixed lower plate 10 and an upper slotted plate 11, the slots in which determine the travel of the carriers 12 which are driven by the gear train 14. Each carrier holds the usual cylindrical crosswound spool 15 and is provided with the usual yarn tensioning device 16. The upper and lower plates 10 and 11 have corresponding central apertures 18 and 19 through which passes the tubing 20 which is to be covered. (After being covered, the tubing is designated 20'.) The tubing is usually unwound from a reel (not shown) underneath the machine. As is well known, the carriers, of which there are usually 24 or 36, travel about the tubing in such manner as to weave a braid thereon. The tubing passes upwardly over a rotating capstan 21 which is driven through the pinion 22 by the gear 24 which is fixed on the cross-shaft 25. The pinion 22 meshes with a ring gear 26 which is fastened to the side of the capstan 21. To hold the tubing in contact with the capstan, a spring-actuated roller 28 is usually provided and is pressed against the capstan by any suitable means. As the tubing 20' passes off of the capstan 21, it is directed through a steaming device 29.

For the purpose of maintaining the tubing 20—20' under an inflating pressure during the braiding process, a short length of flexible tubing 30 is provided with a fitting 31 which can be inserted into the end of the tubing 20'. The tubing 30 is connected to a compressed air line 32 which may be equipped with a pressure gauge 34. The other end of the tubing, 20, may be made air-tight by folding it over and clamping it as shown at 33.

In the usual method of braiding directly on the tubing, as distinguished from the other known method of braiding on a hollow pin or mandrel from which the formed braid is slipped off onto the tube passing therethrough, the tubing is drawn through the machine by the capstan 21, the carriers 12 rotating around it, and the yarns or wires 35 are drawn from their spools 15 through the tension devices 16 at an angle to the tubing which is determined by its rate of travel, the speed of the machine, and the tension. The angle so formed between the tubing and the yarns will be referred to herein as the "braiding angle," and the point at which the braid is formed on the tubing as the "braiding point."

In accordance with the present invention, however, the braid is formed within the orifice of a die 36 which is held by a set screw 38 in an arm 39. The arm 39 is rigidly secured to any convenient part of the frame of the machine (not shown). In order to assure that the braid will not be formed before the tubing passes through the die 36, this die is positioned slightly below the normal braiding point of the machine. The guide arm usually found on braiding machines, which loosely surrounds the tubing above the braiding point, may be adapted to hold the die 36 and then lowered so as to hold the die below the braiding point.

Figure 2:
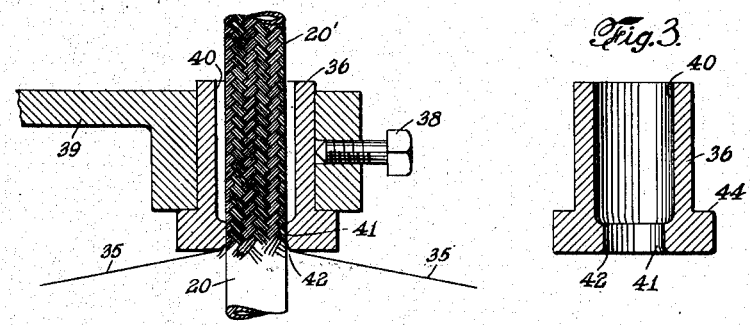
Fig. 2 is a cross-section through the braiding die and its holder, showing the tubing as it passes therethrough.
Figure 3:
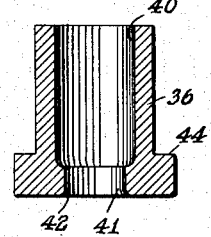
Fig. 3 is a longitudinal cross-section through the braiding die alone.

Referring to Figs. 2 and 3, the die 36 is provided with a cylindrical opening 40 slightly larger in diameter than the inflated covered tubing. At its lower end it is provided with a restricted cylindrical orifice 41, the lower edge of which is smoothly rounded as shown at 42. The die is preferably provided with a shoulder 44 to prevent its upward movement in the arm 39.

The size of the openings 40 and 41 through the die 36 will, of course, vary with the size of the tubing being covered. The diameter of the orifice 41 is carefully selected so as to be no greater than the minimum outside diameter of the covered tubing in its inflated condition so that it functions to eliminate irregularities which exist in the diameter of the uncovered tubing 20.

The position of the die 36 relative to the feed of the yarns 35 and the normal free braiding point results in the formation of an artificial braiding point within the confines of the orifice 41. As explained above, the uncovered tubing 20 is somewhat irregular in diameter and therefore has portions which are undersize and portions which are oversize. The undersize portions, which are the portions of minimum diameter, when covered with braid will fit snugly in the orifice 41, but as will readily be understood, the oversize portions will be drawn down to the same diameter as the undersize portions as they pass through this orifice, at which point the braid is applied under tension. Preferably a rather high tension is used by placing the proper tension springs on the tension devices 16 in a manner well known in the art. This removes most of the elasticity from the yarn and enables it, when formed into a braid, to compress the tubing at those points where it may be oversize. The pull of the yarn, as will be seen in Fig. 2, is not directly on the tubing but is mainly against the edge 42 of the die 36. As the tubing emerges from the orifice 41, it may expand slightly at its oversize portions, but in doing so it will put an additional tension on the threads which will be exerted during the subsequent steaming operation to again reduce these portions to the desired size while the tubing is in a softened condition.

Figure 4:
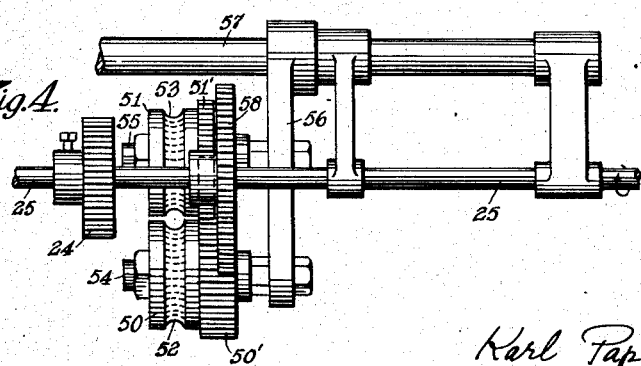
Fig. 4 shows the auxiliary gripping wheels which draw the tubing through the die together with associated parts of the braiding machine.

Referring now to Figs. 1 and 4, it is desirable to utilize a pair of auxiliary gripping wheels 50 and 51 for drawing the tubing through the die 36. These wheels are provided with circumferential grooves 52, 53, the sides and bottoms of which are serrated to grip the tubing, as shown in Fig. 4. The wheels 50 and 51 are positioned closely above the arm 39 and are rotatably mounted on shafts 54 and 55 held in the arm 56 which is mounted on the frame 57 of the braiding machine. The wheels 50 and 51 are fixed to the gears 50' and 51' which mesh with one another and which are driven by the gear 58 which is fixed on the cross shaft 25.

The purpose of using the wheels 50 and 51 to draw the tubing through the die 36, instead of depending entirely on the pull exerted by the capstan 21, is to prevent undue stretching of the somewhat elastic tubing between the die 36 and the capstan 21. If the capstan alone is used, the tubing will be stretched when oversize sections are going through the die 36 and is liable to jump, due to its elasticity, when the oversize section has passed through the die, thus increasing its rate of travel and producing irregularities in the braid. By exerting the pull on the tubing at a point close to the die, this difficulty is eliminated.

As the tubing 20' leaves the capstan 21, it passes through a chamber 29 in which solvent is applied for bonding the covering to the tubing. This chamber is shown in detail in Figs. 7, 8, and 9, and is constructed as follows: The chamber proper is a sheet metal cylinder, the ends of which are closed except for openings in the upper part through which the tubing passes. These openings are preferably in the form of short tubes 60 and 61, the edges of which are turned inwardly to closely fit the tubing 20'. The tubes 60 and 61 are provided with openings 62 and 63 within the chamber 29 through which any condensate can drain into the chamber. A pipe 64 having a central opening 65 passes through the chamber from one side to the other and is secured therein by soldering or the like so that the opening of the pipe is directed away from the tubing 20', thus preventing the steam, which is the solvent used in this embodiment, from blowing directly against the tubing. The pipe 64 is connected at one end to a steam line 66 in which is interposed a manually operated valve 67 having a hand wheel 68. The other end of the pipe 64 is connected to a compressed air line 69 containing a check valve 70 which permits air to enter the chamber 29, but prevents steam or condensate from entering the air line. At the lowermost portion of the chamber 29, as it is normally positioned as shown in Fig. 1, it opens into a drain pipe 71. In order to obtain the correct amount of steam, the valve 67 is opened until the steam can be seen emerging from the tubes 60 or 61 and it is then shut down to the point where there is just enough steam escaping to be visible.

In the operation of a braiding machine the machine stops automatically whenever a yarn breaks or a spool becomes empty. In order to prevent excessive steaming of the tubing at such times, which would be liable to damage it, means are provided for automatically scavenging the steam from the chamber 29 immediately upon the stoppage of the machine. As is shown in Figs. 5 and 6, the air line 69 is controlled by a plunger type air valve 80 which is actuated by a plunger 81. This valve is mounted adjacent the standard trip device 82 which is pivotally mounted on the upper plate 11 of the braiding machine adjacent the grooves 84 in which the carriers 12 travel. As is well known, when a yarn breaks or a spool becomes empty, a shoe 85 on the carrier 12 (Fig. 1) drops to the bottom of the carrier and engages the trip lever 82, the path of the shoe 85 being indicated in dotted lines in Fig. 6. This moves the lever 82 to the right and disengages a clutch (not shown) through the medium of an upwardly extending stud 86. The lever 82 at the same time presses against the plunger 81 and admits air into the air line 69, the manually operated air valve 90 being open at this time. The lever 82 remains in this position, holding the air valve 80 open, until the machine is started again by moving lever 82 to the left. Immediately on the stopping of the machine, however, the operator closes the steam valve 67 and thereafter closes the manual air valve 90. When the machine is again started, the steam valve 67 is opened and adjusted, and, the plunger air valve 80 then being closed, the manual air valve 90 is reopened. The machine is then in condition automatically to blow air into chamber 29 when it stops again. If the operator stops the machine, he does so by moving lever 82 to the right and the air valve 80 is opened just as it is when the machine stops itself automatically.

The injection of air into chamber 29 through pipe 69 (see Fig. 9) has the effect of condensing the steam, the condensate draining out through pipe 71. The air also blows out around the tubing 20' through the tubes 60 and 61.

The apparatus for effecting the automatic scavenging of chamber 29 is not claimed herein as it is the subject of my co-pending application Serial No. 390,037, filed as a division hereof.

The operation of the apparatus described above as it is used in carrying out the process of the invention will now be explained. A reel of extruded tubing is placed in position to be fed into the braiding machine and a die 36 of the proper size relative to the tubing is inserted in the holder 39. The length of compressed air tubing 30 is fed through the chamber 29, over the capstan 21 and plugged into the end of the tubing 20 which has been drawn up through the die 36 and between the wheels 50 and 51 for a short distance. The carriers 12 are supplied with spools of any desired type of yarn which is drawn through the tension devices and fastened around the tubing 20 in known manner. The other end of the tubing 20 is closed air-tight and the air pressure is turned on.

The amount of air pressure in the tubing at the time of braiding may be varied within fairly wide limits, the actual pressure used depending upon the size and thickness of the tubing, the gauge and tensile strength of the yarn being used, etc. In actual practice it has been found that pressures from 30 to 45 pounds are satisfactory. If the pressure is too high in relation to the size of the tubing and the strength of the yarn, the yarn may not be strong enough to hold the tubing against expansion in its softened state in the chamber 29. If the air pressure is not high enough, the undersize sections thereof may not be held in close contact with the orifice 41 in die 36 and oversize portions may become creased or buckled in going through the die. Also, the wheels 50 and 51 may not grip the tubing sufficiently to prevent slipping because the pressure is too low to enable the wheels to grip the tubing with sufficient friction.

The braiding machine is then started by moving lever 82 to the left and the braiding operation is carried out in the usual manner until the tubing 20' approaches the chamber 29. The steam valve 67 is then opened by the proper amount to fill the chamber 29 with steam so that a slight amount escapes therefrom. The manually operated air valve 90 is then opened. As the tubing 20 is drawn through the die it is reduced to a uniform diameter and the application of the braid thereto within the orifice 41, under tension, maintains the diameter substantially uniform. As the covered tubing 20' passes through the chamber 29, it is subjected to a steam bath which penetrates the fabric cover and softens the plastic tubing, rendering the surface thereof adhesive by its solvent action. After the tubing 20' emerges from the chamber 29 and while it is still under an inflating pressure, the excess water evaporates and the surface of the tubing and the braid are dried out, forming a firm adhesive bond between the tubing and its covering.

Whenever the braiding machine is stopped, either manually or automatically, air is immediately blown into the chamber 29 which prevents the steam from unduly softening the tubing or excessively wetting the fabric cover. As soon as the machine stops, the operator turns off the steam and the air, resetting the steam and air valves as described above, and the machine is again started. Inasmuch as the inflating pressure on the tubing being covered is maintained until the covering operation on the entire length of tubing has been completed, the tubing becomes sufficiently dry while under pressure to maintain its now uniform size when the tubing is disconnected from the air line 30.

By the process and apparatus described above, it is possible to produce tubing of greatly improved uniformity which can be held to much closer tolerances and which can be subsequently covered with other materials in known manner and applied to standard size fittings in a much more satisfactory manner than has heretofore been possible.

While the invention has been described with relation to a specific apparatus and as carried out in the covering of a specific type of tubing, this description has been given only by way of example and is not to be taken as limiting the invention to the particular details described.

What is claimed is:

1. The method of covering plastic tubing with a textile fabric formed directly thereon which comprises maintaining said tubing under an inflating pressure, drawing the inflated tubing through a die orifice the diameter of which is no greater than the minimum outside diameter of the inflated covered tubing, said die being so positioned in a machine for forming tubular fabric that the formation of said fabric takes place within said orifice and weaving the fabric on the tubing as it is drawn through said orifice.

2. The method of covering plastic tubing with a textile fabric formed directly thereon which comprises maintaining said tubing under an inflating pressure, drawing the inflated tubing through a die orifice the diameter of which is no greater than the minimum outside diameter of the inflated covered tubing, said die being so positioned in a machine for forming tubular fabric that the formation of said fabric takes place within said orifice, weaving the fabric on the tubing as it is drawn through said orifice and treating the covered tubing with solvent for the tubing to bond the covering thereto.

3. The method of covering a plastic tubing with braid which comprises maintaining said tubing under an inflating pressure, drawing the inflated tubing through a die orifice so positioned in a braiding machine that the braiding point is within said orifice, the diameter of said orifice being no greater than the minimum outside diameter of the inflated covered tubing, and forming the braid on the tubing as it is drawn through said die.

4. The method of covering a plastic tubing with braid which comprises maintaining said tubing under an inflating pressure, drawing the inflated tubing through a die orifice so positioned in a braiding machine that the braiding point is within said orifice, the diameter of said orifice being no greater than the minimum outside diameter of the inflated covered tubing, forming the braid on the tubing as it is drawn through said die, applying solvent to the tubing through the braid to produce a bond therebetween, and thereafter removing the excess solvent.

5. The method of covering a plastic tubing with braid which comprises maintaining said tubing under an inflating pressure, drawing the inflated tubing through a die orifice so positioned in a braiding machine that the braiding point is within said orifice, the diameter of said orifice being no greater than the minimum outside diameter of the inflated covered tubing, forming the braid on the tubing as it is drawn through said die, and passing the tubing through vapor of a solvent for the tubing under conditions permitting the solvent to penetrate the braid.

6. The method of covering polyvinyl alcohol tubing with braid which comprises maintaining said tubing under an inflating pressure, drawing the inflated tubing through a die orifice so positioned in a braiding machine that the braiding point is within said orifice, the diameter of said orifice being no greater than the minimum outside diameter of the inflated covered tubing, forming the braid on the tubing as it is drawn through said die, and steaming the covered tubing for a sufficient time to permit the steam to penetrate the braid and render the surface of the tubing adhesive.

7. The method of covering plastic extruded tubing which is non-uniform in its diameter with a textile fabric and simultaneously rendering the diameter of the covered tubing substantially uniform, which comprises drawing said tubing through a die orifice, said orifice being positioned at such a point in a machine for weaving a tubular fabric that said fabric is formed within said orifice, the diameter of said orifice being no greater than the minimum diameter of the covered tubing whereby the diameter of the tubing is made uniform as it passes through said die, and weaving a cover on said tubing at it passes through said orifice under sufficient tension to maintain said uniform diameter.

KARL PAPE.